United States Patent
Nichols et al.

(10) Patent No.: US 11,439,938 B2
(45) Date of Patent: Sep. 13, 2022

(54) REUSABLE EXOSKELETON FRAME WITH U-SHAPED LOCKING MEMBERS AND ECO-FRIENDLY AIR FILTER ELEMENT

(71) Applicant: MANN+HUMMEL LIFE SCIENCES & ENVIRONMENT HOLDING SINGAPORE PTE. LTD., Singapore (SG)

(72) Inventors: Jon Garth Nichols, Four Oaks, NC (US); Brian Crawford, Fayetteville, NC (US); Nilesh Tharval, Morrisville, NC (US)

(73) Assignee: MANN+HUMMEL Life Sciences & Environment Holding Singapore Pte. Ltd., Singapore (SG)

( * ) Notice: Subject to any disclaimer, the term of this patent is extended or adjusted under 35 U.S.C. 154(b) by 218 days.

(21) Appl. No.: 17/085,872

(22) Filed: Oct. 30, 2020

(65) Prior Publication Data

US 2022/0134267 A1 May 5, 2022

(51) Int. Cl.
*B01D 46/00* (2022.01)
*B01D 39/08* (2006.01)
*B01D 39/20* (2006.01)
*B01D 46/16* (2006.01)

(52) U.S. Cl.
CPC ....... *B01D 46/0005* (2013.01); *B01D 39/083* (2013.01); *B01D 39/2062* (2013.01); *B01D 46/0028* (2013.01); *B01D 46/0036* (2013.01); *B01D 46/0038* (2013.01); *B01D 46/16* (2013.01); *B01D 2239/045* (2013.01); *B01D 2239/0407* (2013.01); *B01D 2239/0442* (2013.01); *B01D 2239/065* (2013.01); *B01D 2239/0613* (2013.01);

(Continued)

(58) Field of Classification Search
CPC ............ B01D 46/0002; B01D 46/0005; B01D 46/0028; B01D 46/0036; B01D 46/0038; B01D 46/10; B01D 46/16; B01D 2271/02–027; B01D 2275/10
See application file for complete search history.

(56) References Cited

U.S. PATENT DOCUMENTS

| 4,999,038 A | * | 3/1991 | Lundberg | ............... | B01D 46/10 55/501 |
| 5,183,488 A | * | 2/1993 | Deering | ................ | B01D 46/10 55/513 |

(Continued)

FOREIGN PATENT DOCUMENTS

| DE | 102012012669 A1 | 1/2013 |
| EP | 2463009 A1 | 6/2012 |

(Continued)

*Primary Examiner* — Robert Clemente

(57) ABSTRACT

A replaceable air filter element has a multilayer filter medium panel configured for mounting on a reusable exoskeleton support frame. The exoskeleton support frame is installable on a flow face of the filter medium panel and is provided with U-shaped locking members configured to detachably engage with and mount the filter medium panel. The exoskeleton support frame is configured to be reused such that only the filter medium panel is replaced, thereby reducing the environmental waste and making for a "green" eco-friendly air filter element.

14 Claims, 7 Drawing Sheets

(52) U.S. Cl.
CPC .. *B01D 2239/0645* (2013.01); *B01D 2271/02* (2013.01); *B01D 2275/10* (2013.01)

(56) References Cited

U.S. PATENT DOCUMENTS

| | | | | |
|---|---|---|---|---|
| 5,989,303 | A * | 11/1999 | Hodge | B01D 46/0032 55/497 |
| 6,165,240 | A * | 12/2000 | Hodge | B01D 46/0036 55/497 |
| 6,389,832 | B1 * | 5/2002 | Wu | B01D 46/10 62/262 |
| 10,143,953 | B1 | 12/2018 | Lee et al. | |
| 10,259,293 | B2 | 4/2019 | Schumacher | |
| 2003/0230061 | A1 | 12/2003 | Kubokawa | |
| 2007/0175192 | A1 * | 8/2007 | Niakan | B01D 46/521 55/486 |
| 2008/0163595 | A1 * | 7/2008 | Knapp | B01D 46/10 55/498 |
| 2009/0158697 | A1 * | 6/2009 | Magee | B01D 46/0002 55/492 |
| 2017/0348624 | A1 | 12/2017 | Do | |
| 2021/0069622 | A1 * | 3/2021 | Cayce, Jr. | B01D 46/0005 |

FOREIGN PATENT DOCUMENTS

| | | | |
|---|---|---|---|
| JP | 2001046824 | A | 2/2001 |
| KR | 20040075449 | A | 8/2004 |
| WO | 2015149935 | A1 | 10/2015 |

\* cited by examiner

REUSABLE EXOSKELETON FRAME WITH U-SHAPED LOCKING MEMBERS AND ECO-FRIENDLY AIR FILTER ELEMENT

TECHNICAL FIELD

The invention relates to the field of air filtration, and in particular, to a replaceable air filter element having a reusable exoskeleton support frame. The exoskeleton support frame is arranged on an exterior of the filter medium and includes U-shaped mounting members designed to detachably engage and support the filter medium. The exoskeleton support frame of the filter element is configured to be reused such that only the filter medium is replaced, thereby reducing the waste and making for a "green" eco-friendly air filter element.

BACKGROUND OF THE INVENTION

Air filters are commonly applied to remove particulates from building air circulation and heating, ventilation and air conditioning (HVAC) systems, for example. Application include air heating, cooling or fresh air circulation systems, for example, in office buildings, factory buildings, commercial retail establishment and residential structures. A HVAC system, as used herein may be a system having at least one or more of the following capabilities: air heating, air cooling, humidity control, and air circulation.

For larger buildings, such as office buildings and retail stores, one or more HVAC systems, due to building size and HVAC system size, may be installed at relatively inaccessible places, such as on the roof of the building.

Often the air from the interior space as well as outdoor air may be laden with undesired or harmful particulates, chemicals, odors, microbes, germs or other contaminants carried in the circulated air. It is highly desirable to remove such pollutants.

To remove particulates and preferably other contaminates, the circulated air may be passed through one of more air filter elements arranged in the air circulation ducts or HVAC system. For larger structures such as factories, office buildings and retail stores, the filter may be arranged at relatively inaccessible locations, such as, for example, on the roof of a building.

Available prior art air filter elements for such HVAC and air circulation systems are generally designed to be installed into the ductwork or a filter receptacle in the HVAC system. The air filter has a finite service life. The air filter is used for a finite period of time until the filter becomes clogged or soiled, and then the filter element is removed and discarded. The filter medium, which is typically a cellulose or woven or non-woven fiber material, on its own is rather flexible and lacks structure rigidity. Therefore to provide a structurally stable filter element, the filter medium is permanently encased in or surround by a support frame. The support frame typically encloses or surrounds the filter medium and is permanently secured to the filter medium. The support frame. In the prior art, the filter element include the frame is discarded with the filter medium whenever a new replacement filter element us installed. The discarded filter element typically ending up in a landfill or waste dump.

Additionally, the prior art air filter elements having the each require addition materials to produce the frame, additional storage space in shipping and handling (due to the space occupied by the frame), and then generate additional waste material when the filter element is removed and replaced at the end of it life.

Prior art filter element, for cost reasons, often have cardboard or cellulose frames. Such frames members can become structurally compromised, losing stiffness, when the frame becomes wet due to humidity or the presence of water. Such frame members can collapse, and the filter element lose structural and shape integrity, preventing the filter element from sealing in the filter receptacle or duct and allowing unfiltered air to bypass the filter element. Additionally, a wet frame can provide a medium for the growth of unhealthy mold and spores and introduce the same into the circulated air flow.

SUMMARY OF THE INVENTION

Accordingly, there is a need for a reusable support frame and an improved "green", environmentally friendly air filter element that is designed to replace prior art air filter elements in HVAC and air circulation systems, which permits the filter medium to be replaced onto the existing filter frame. Such a configuration reduces waste generated by end of life filter elements and provides a more environmentally friendly air filtration product requiring less material to manufacture and less storage and reduced packaging/shipping space.

According to the invention, the air filter element includes a filter medium panel having one or more air filtration ply layers of filter media overlaid and stacked to form the multilayer air filter medium. The filter medium panel includes one or more layers of stacked filter media, the filter media is preferably a synthetic polyester material. The filter medium panel has a plurality of correlated locking slits provided on the lateral edge surfaces. The multilayer air filter medium panel is preferably elastically compressible such that is may be compressed or deformed to be inserted under a U-shaped locking member or members provided on the exoskeleton support frame, at least until the U-shaped locking member engages into the correlated locking slits, thereby locking the exoskeleton support frame onto the air filter medium panel to support the multilayer air filter medium panel.

The filter medium panel may be surrounded by a seal, to seal the perimeter of the filter element to a housing in which the filter element is to be installed.

The filter medium panel may be treated with EPA approved treatments to control and reduce the growth of microbial within the filter element.

The U-shaped locking members of the reusable exoskeleton support frame are aligned and positioned to receive and engage into layers of the filter medium panel through the correlated locking slits. The reusable exoskeleton support frame forms a rigid outer exoskeleton support frame for the filter medium panel.

Preferably one or more support ribs or wire rods are fixed onto the outer support frame and extend across an interior flow space in an interior of the exoskeleton support frame, in some cases the support ribs or wire rods may preferably form a support grid.

At least one of the filtration layers of the filter medium panel may include a gas phase treatment medium having a granular fill configured to trap and remove gas phase contaminates, such as irritating and obnoxious odors, and chemical contaminants. The granular fill may include, for example, granular activated carbon, a carbon and impregnated alumina blend or a blend of zeolite, carbon and impregnated alumina. The granular fill is arranged between two cover sheets, preferably the cover sheets are polyester filter media sheets.

Preferably the granular fill is adhesively bonded to at least of the cover sheets to hold the granular fill in position on the cover sheet and maintain a uniform distribution in the gas phase treatment medium.

In some aspects of the invention, the at least one filtration layers of the filter medium panel may advantageously include at least one a bio-functional carrier layer. As used herein, we define term "bio-functional material" to include any of: antimicrobial materials which may include anti-viral materials, anti-bacterial materials, and anti-allergenic materials, which are arranged on, arranged in, or coated onto or embedded into the at least one bio-functional carrier layer. As used herein, we define "at least one bio-functional carrier layer" to be one or a plurality of bio-functional carrier layers, arranged adjacently, each of which may include at least one of the bio-functional materials.

Advantageously, the antimicrobial material also serves to prevent metabolization or decomposition of the anti-allergenic material, in particular by fungi. This is particularly relevant for anti-allergenic materials in the form of polyphenols.

As antimicrobial material, in particular zinc pyrithione can be used. Alternatively or additionally, octylisothiazolinone can be used as an antimicrobial material. The at least one at least one a bio-functional carrier layer may contain dimethyltetradecyl [3-(trimethoxysilyl)propyl ammonium chloride aka quaternary ammonia compound. The at least one a bio-functional carrier layer moreover may contain antimicrobial or anti-viral materials on the basis of nanosilver. The at least one a bio-functional carrier layer can also contain antimicrobial or anti-viral metals and metal compounds, in particular silver, copper, and aluminum compounds, and/or 2-bromo-2-nitropropane-1,3-diol, further isothiazolinone compounds, benzoic acid and its derivatives, benzalkonium halides, water-soluble coenzymes, oil-soluble coenzymes, plant extracts, antibiotics, biocidal metals, aliphatic and/or aromatic fatty acids and/or quaternary surfactants as antimicrobial materials. The application of a biocidal substance on air filtration applications is registered according to EU BPR 528/2012 and US PR 2000-1.

As anti-allergenic materials, polyphenols such as catechines, tannins or flavonoids, are conceivable. In particular, caffeic acid, gallic acid, ellagic acid, tannic acid, cyanidin, procyanidin, proanthocyanidins, rutin, quercetin, resveratrol can be employed. Moreover, for example, tannin or tannic acid, in particular derived from wood (for example tree bark), apple extracts or citrus fruit extracts are conceivable. These material bind preferably allergenic substances so that the allergenic effect can be reduced or removed from the filtered air. Allergens are denatured by polyphenols, for example. The anti-allergenic material can moreover comprise anti-allergenic enzymes.

To reduce waste, the filter medium panel is detachably supported on the exoskeleton support frame. The exoskeleton support frame is reusable, such that when replacing the air filter element, only the filter medium panel needs to be replaced. The exoskeleton support frame is designed to be reused and the new filter medium panel is then install on and lockably engaged to mount the filter medium panel to the exoskeleton support frame.

The exoskeleton support frame is preferably formed of substantially rigid metallic wire or rods, preferably corrosion treated steel, chromed steel or aluminum or galvanized steel. The exoskeleton support frame acts to hold the shape of the filter medium panel in a desired shape or form to be received into and preferably seal at its periphery against a filter receptacle in an air duct or HVAC system.

The exoskeleton support frame may have one or more support ribs or rods, also preferably corrosion treated steel, chromed steel or aluminum or galvanized steel, arranged to support the filter medium against forces created by airflow through the filter medium. As such, the one or more support ribs or rods are preferably arranged at the clean side or outlet flow side of the filter medium.

Preferably the material of the exoskeleton support frame is rigid and impervious to moisture and is preferably one piece. Preferably the support frame with the one or more support ribs or rods is a welded rigid one-piece unitary construction.

In various aspects of the invention, replacement of the filter element is accomplished by replacement of the used filter medium panel with a new filter medium panel installed onto the reusable exoskeleton support frame. The exoskeleton support frame is configured and adapted for reuse, thereby reducing environmental waste and reducing filter element replacement cost.

An air filter element according to the present inventive disclosure includes a multilayer filter medium panel comprising a plurality of air filtration ply layers of filter media overlaid and stacked to form the multilayer air filter medium panel. At least some of the air filtration ply layers may comprise a synthetic woven fabric material. The multilayer air filter medium panel has an inflow face where air to be filtered enters the multilayer air filter medium panel; and an outflow face where filtered air exits the multilayer air filter medium panel. The air filtration ply layers of filter media of the stacked multilayer air filter medium panel are affixed to immediately adjacent sheets of stacked multilayer air filter medium panel, holding the air filtration ply layers of filter media together as a unitary multilayer air filter medium panel. The layers may be fixed together by radio frequency welding. The multilayer air filter medium panel has a plurality of outer lateral edge surfaces which together circumferentially surround the multilayer air filter medium panel, the plurality of outer lateral edge surfaces extending from the inflow face to the outflow face. The multilayer air filter medium panel includes at least one pair of correlated locking slits. Each slit of an individual one of the at least one pair of correlated locking slits is formed into a respective one of the plurality of outer lateral edge surfaces and extends laterally from the outer lateral edge surface inwardly into the overlaid filter media, extending completely through the multilayer air filter medium panel from the inflow face to the outflow face. A first correlated locking slit of the pair of correlated locking slits extend on the inflow face and the outflow face in an inward direction and is spaced apart from and not reaching a correlated second locking slit of the pair of correlated locking slits. The first correlated locking slit of the pair of correlated locking slits is formed into a different one of the plurality of outer lateral edge surfaces relative to the correlated second locking slit of the pair of correlated locking slits. The correlated locking slits are each configured to receive and mountably engage U-shaped locking member(s) of the exoskeleton support frame.

In some aspects of the invention, the outer lateral edge surfaces multilayer air filter medium pad have a first outer lateral edge surface and a different second outer lateral edge surface. The first and second outer lateral edge surface may be directly adjacent, or may be positioned oppositely across the multilayer air filter medium panel. In some cases, the first outer lateral edge surface joins to the adjacent second outer lateral edge surface forming a corner there between, the corner advantageously elastically deformable to compress in size to receive under and engage the legs of the U-shaped mounting member of the exoskeleton support frame.

In all aspects of the invention, the multilayer air filter medium panel is preferably elastically compressible enabling the panel to be fitted under a U-shaped locking member of an exoskeleton support frame and elastically compressed to receive the legs of the U-shaped locking member into the correlated locking slits.

In aspects of the invention, the exoskeleton support frame has a circumferentially closed outer peripheral frame forming an outer boundary of the exoskeleton support frame and surrounds and defines an inner flow space opening of the exoskeleton support frame. The circumferentially closed frame is sized to have outer peripheral edges or peripheral edge corners of the circumferentially closed frame arranged against and supporting the multilayer air filter medium panel, preferably on the outflow face.

In aspects of the invention, the exoskeleton support frame at least one U-shaped locking member, the U-shaped locking member having two spaced apart legs joined by the mounting member, the two legs having an outer end fastened onto the exoskeleton support frame, the at least one the U-shaped locking member protruding outwardly away from a plane of the exoskeleton support frame. The mounting member of the mounting member is arranged on and extends from the first correlated locking slit to the correlated second locking slit of the pair of correlated locking slits.

In some aspects of the invention, the exoskeleton support frame includes one or more support ribs or support rods extending across the circumferentially closed frame and across the inner flow space opening of the exoskeleton support frame, opposing ends of the one or more support ribs or support rods fixedly secured onto the exoskeleton support frame. The one or more support ribs or support rods may be spaced apart across inner flow space opening of the exoskeleton support frame. The one or more support ribs or support rods extend across the outflow face of the filter medium panel, supporting the filter medium panel against flow forces induced by air flow through the filter medium panel.

In some aspects of the invention, the exoskeleton frame is formed of metallic wire or rod material forming a structurally rigid exoskeleton support frame. Preferably the metallic wire or rod material of the exoskeleton frame is corrosion treated steel, chromed steel or aluminum or galvanized steel.

In some aspects of the invention, the one or more support ribs or support rods intersect in the inner flow space opening of the exoskeleton support frame, forming a support grid to support the outflow face of the filter medium panel against flow forces.

In some aspects of the invention, the one or more air filtration ply layers of the filter medium panel include at least one gas phase treatment medium ply layer having a granular fill configured to trap and remove gas phase contaminates, chemical contaminants and irritating and obnoxious odors, the at least one gas phase treatment medium ply layer having at least one cover sheet. Preferably the granular fill is adhesively bonded to the at least one cover sheet to fix the granular fill in position on the at least one cover sheet and maintain a uniform distribution in the gas phase treatment medium ply layer.

In some aspects of the invention, the granular fill is selected from the set consisting of: granular activated carbon, a carbon and impregnated alumina blend or a blend of zeolite, carbon and impregnated alumina.

In some aspects of the invention, the synthetic woven fabric material of the filtration media ply layers includes a synthetic polyester material.

In some aspects of the invention, a radially outer circumferential portion of the filter medium panel includes a resilient and compressible seal configured to form a seal between the filter medium panel and a housing configured to receiving the filter medium panel.

In preferred aspects of the invention, the filter medium panel has a filtration efficiency rating from MERV 6 to MERV 13.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
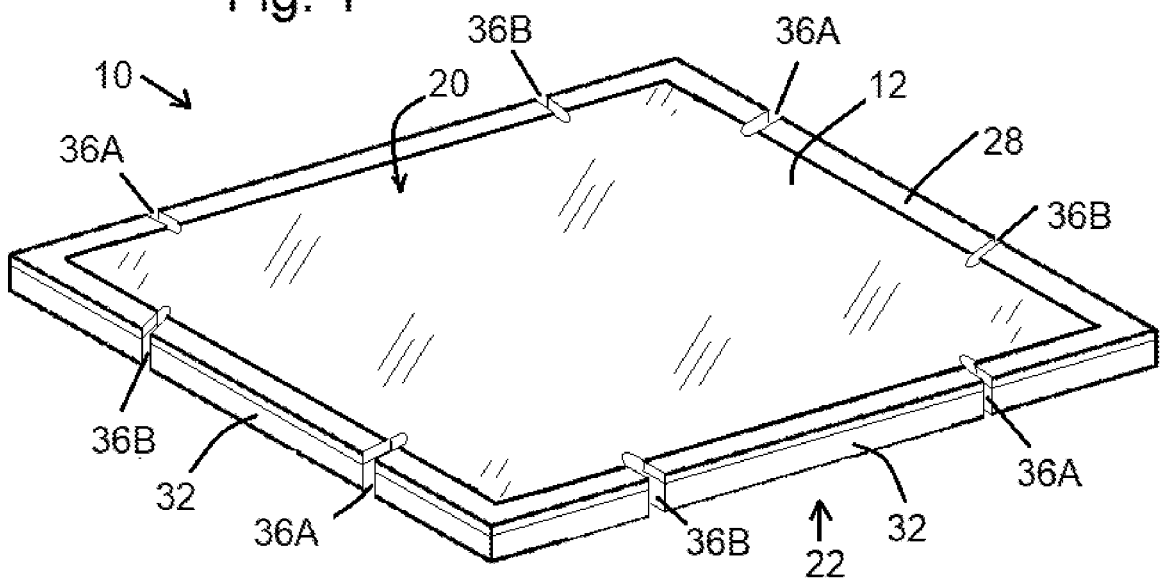
FIG. 1 depicts a perspective view of an air filter element having an air filter panel with one or more stacked filtration layers and a locking slits cut through the peripheral edges of the air filter panel, consistent with the present inventive disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter apparatus. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 depicts a perspective view of a replaceable air filter element 10 having an air filter panel with one or more stacked filtration layers 12 and correlated locking slits 36A, 36B cut through the peripheral edges of the air filter panel into the interior of the air filter panel 12.

Figure 2:
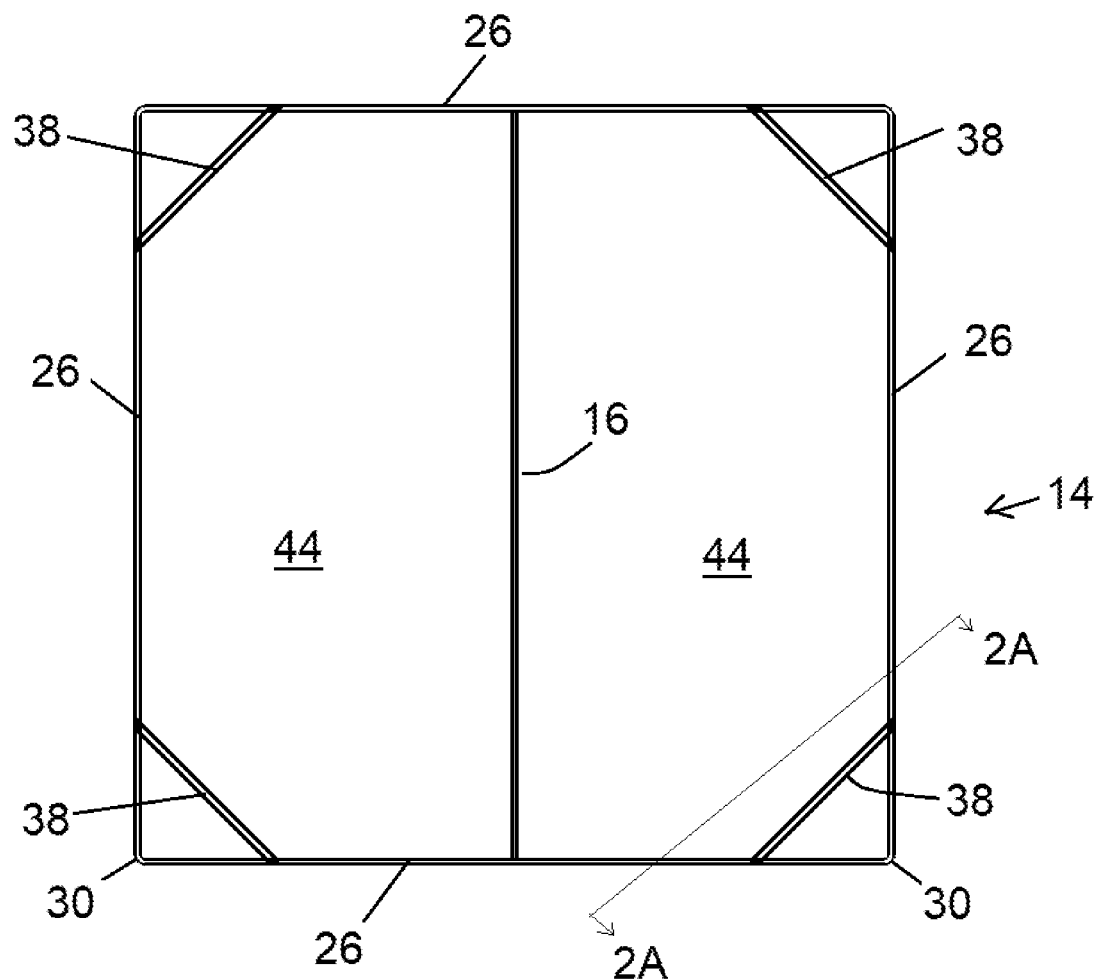
FIG. 2 depicts a schematic plan view of an exoskeleton frame having U-shaped locking members configured to mount and support the air filter panel for FIG. 1, consistent with the present inventive disclosure.
Figure 2A:
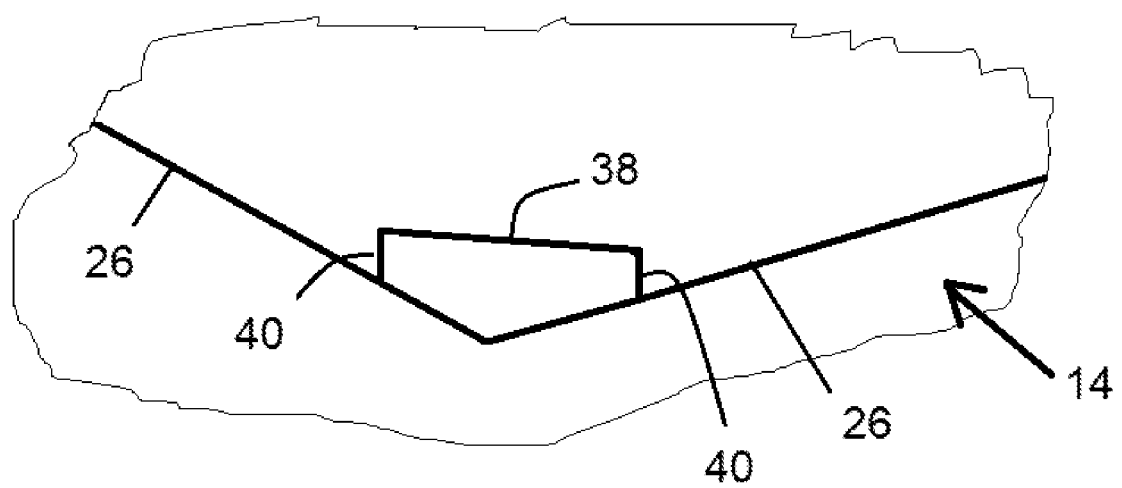
FIG. 2A depicts a schematic partial perspective view of a corner region 2A of FIG. 2, showing the U-shaped locking member.

FIG. 2 depicts a schematic plan view of an exoskeleton frame 14 having U-shaped locking members 38 configured to mount and support the air filter panel, for example, as in for FIG. 1. FIG. 2A depicts a schematic partial perspective view of a corner region 2A of FIG. 2, showing the U-shaped locking member 38 projecting upward out of a plane of the exoskeleton support frame 14.

Figure 3:
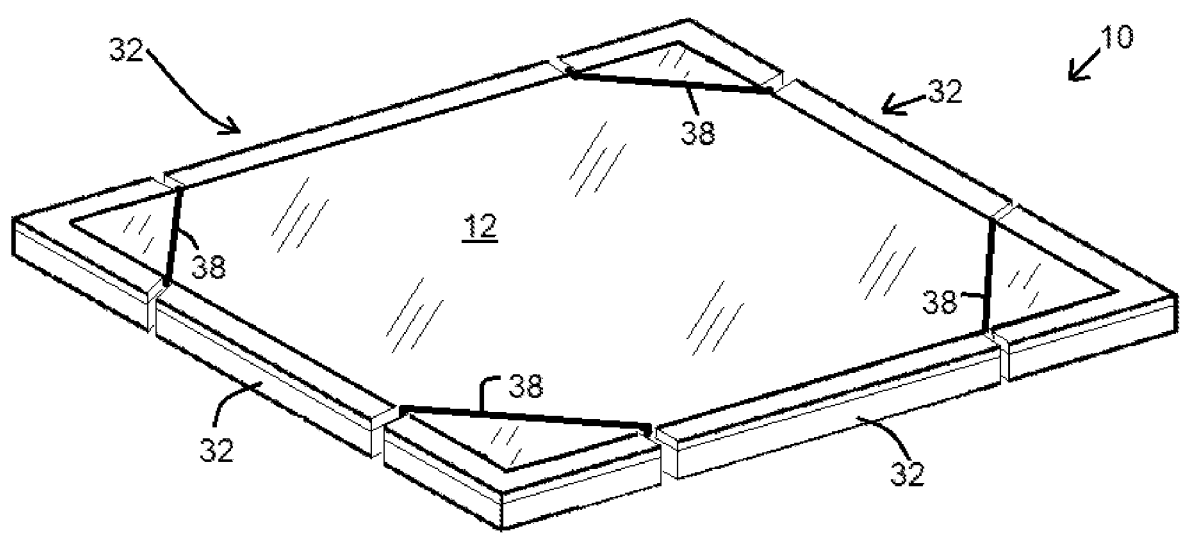
FIG. 3 depicts a schematic perspective view of the air filter panel of FIG. 1 mounted to the an exoskeleton frame of FIG. 2 by the U-shaped locking members of the exoskeleton frame, consistent with the present inventive disclosure.
Figure 3A:
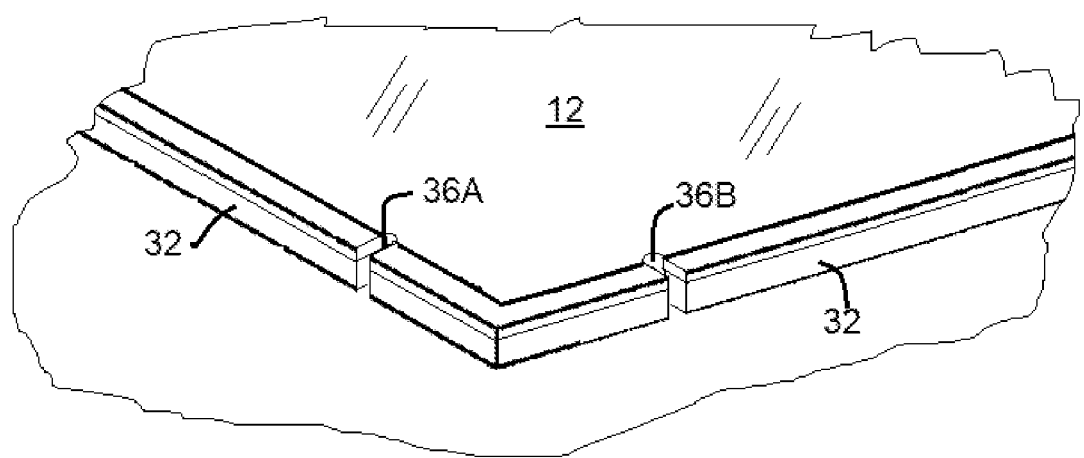
FIG. 3A depicts a partial perspective view of a corner of the air filter panel of FIG. 1, consistent with the present inventive disclosure.

FIG. 3 depicts a schematic perspective view of the air filter panel 12 of FIG. 1 mounted to the exoskeleton frame 14 of FIG. 2 by the U-shaped locking members 38 of the exoskeleton frame. FIG. 3A depicts a partial perspective view of a corner of the air filter panel of FIG. 1, more clearly illustrating the correlated locking slits 36A and 36B which extend completely through the air filter panel 12 from the inflow face 20 to the outflow face 22 of the air filter panel 12. The locking slits 36A, 36B extend only partially across the air filter panel 12 between the locking slits 36A, 36B.

Figure 3B:
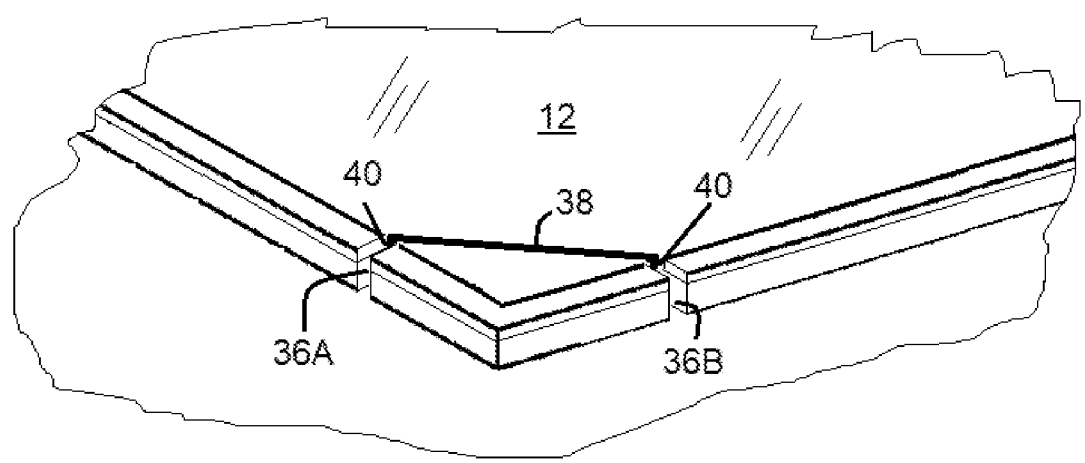
FIG. 3B depicts a partial perspective view of FIG. 3A, in which corners or sides of the air filter panel of FIG. 3A and FIG. 1 are received under and engaged into a U-shaped locking member of the exoskeleton frame, consistent with the present inventive disclosure.

FIG. 3B depicts a partial perspective view of FIG. 3A, in which corners or sides of the air filter panel 12 of FIG. 3A and FIG. 1 are received under and engaged into the U-shaped locking member 38 of the exoskeleton support frame 14. The air filter panel 12 is elastically compressed or deformed to enable fitting under the U-shaped locking member 38. The air filter panel 12 then elastically expands towards the original shaped such the legs 40 of the locking member 38 are engaged into the correlated locking slits 36A and 36B, holding or fixing the air filter panel 12 onto the exoskeleton support frame 14.

Figure 4:
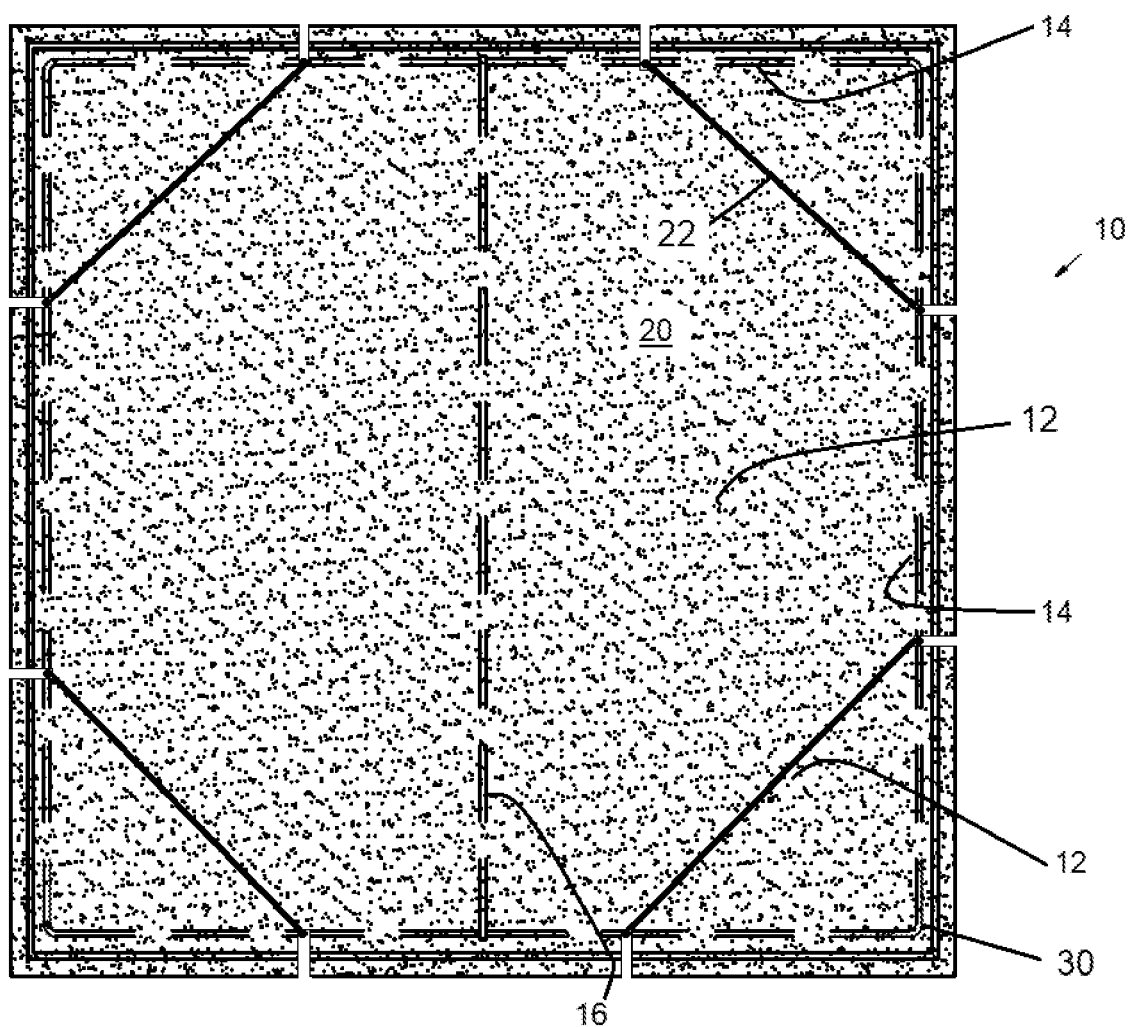
FIG. 4 depicts a plan view of the inflow side air filter element, depicting the air filter panel resting against the exoskeleton frame of FIG. 2 and locked to the frame by the U-shaped locking members of the exoskeleton frame, consistent with the present inventive disclosure.

FIG. 4 depicts a plan view of the inflow side 20 of the air filter element 10 and filter medium panel 12, depicting the air filter panel 12 resting against the exoskeleton frame 14 of FIG. 2 and locked to the frame by the U-shaped locking members 38 of the exoskeleton frame 14. The exoskeleton support frame 14 is show in dashed (hidden) lines as the support frame is at the opposing inflow face 20 of the filter medium panel 12.

Figure 5:
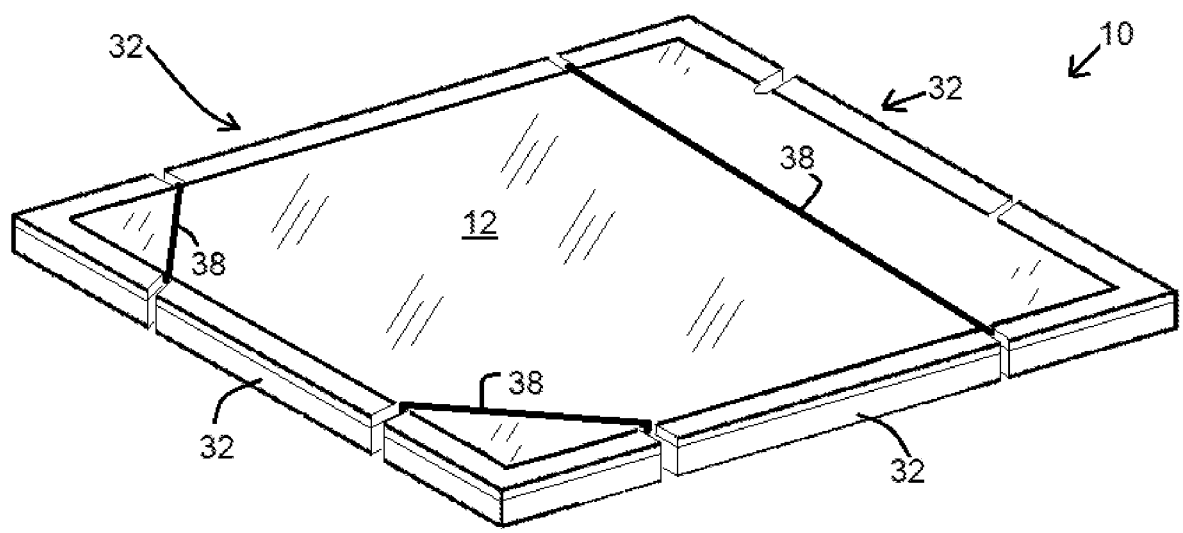
FIG. 5 depicts a perspective view of the air filter panel of FIG. 1 having a U-shaped locking member of the exoskeleton frame extending across the air filter panel from a first lateral surface of the air filter panel to an opposite lateral surface of the air filter panel, consistent with the present inventive disclosure.

As shown in FIG. 5, in some cases, one or more of the U-shaped locking members 38 may be configured to extend completely across the inflow face 20 of the filter medium panel 12, and engage into locking slits 36A or 36B arranged on opposite outer lateral surfaces 32 of the filter medium panel 12.

The replaceable air filter medium panel 12 has one or more plies of filter media sheets 12, plies or layers having porosities selected for particulate removal. The filter media includes preferably of a synthetic woven fabric. In the specific example illustrated, a plurality of correlated locking slits 36A, 36B are each formed into a different respective lateral side surface or edge surfaces of the lateral sides of the air filter medium panel 12, and extend inwardly into and partially across the inflow face 20 and the outflow face 22 of the air filter medium panel 12. The locking slits 36A and 36B are correlated to receive and mountable engage a U-shaped locking member 38 of an exoskeleton support frame 14.

The filter medium panel 12 may be provided with and surround by a compressible seal 28, to seal the outer circumference of the of the filter medium panel 12 to a filter receptacle (not shown) of an air duct or HVAC system in which the filter element is to be installed.

Correlated pairs of locking slits 36A and 36B receive the legs 40 of the U-shaped locking members 38 of the Corner portions 30 of the reusable exoskeleton support frame 14. The air filter medium panel 12 is deformable or compressible to the extent that the air filter medium panel 12 can be fitted into U-shaped locking members. The legs 40 of the U-shaped locking member engage into the correlated locking slits 36A, 36B of the air filter medium panel 12, thereby holding the air filter medium panel 12 onto the exoskeleton support frame 14.

The reusable exoskeleton support frame 14 forms a rigid outer frame support for the filter medium panel 12, supporting the filter medium panel 12 against flow forces induced due to air flow through the filter medium panel 12.

The filtration layers of the filter medium panel 12 may include a gas phase treatment medium having a granular fill configured to trap and remove gas phase contaminates, such as irritating and obnoxious odors, and chemical contaminants, as discussed earlier.

To reduce waste, the filter medium panel 12 is supported on a reusable exoskeleton support frame 14, such that when replacing the air filter medium panel 12 of the air filter element 10, only the filter medium panel 12 needs to be replaced.

The exoskeleton support frame 14 is preferably formed of substantially rigid metallic wire or rods. The exoskeleton support frame 14 acts to hold the shape of the filter medium panel 12 in a desired shape to be received into and seal into a filter receptacle in an air duct or HVAC system.

Preferably one or more support ribs, rods or wire rods 16 are fixed onto the circumferentially closed frame forming the outer boundary of the exoskeleton support frame 14 and extends across the interior flow space of the exoskeleton support frame 14.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An air filter element comprising:
   a multilayer filter medium panel comprising:
      a plurality of air filtration ply layers of filter media overlaid and stacked to form the multilayer air filter medium panel;
      wherein at least some of the air filtration ply layers comprise a synthetic woven fabric material;
      wherein the multilayer air filter medium panel has:
         an inflow face where air to be filtered enters the multilayer air filter medium panel; and
         an outflow face where filtered air exits the multilayer air filter medium panel;
      wherein air filtration ply layers of filter media of the stacked multilayer air filter medium panel are affixed to immediately adjacent sheets of stacked multilayer air filter medium panel, holding the air filtration ply layers of filter media together as a unitary multilayer air filter medium panel;
      wherein the multilayer air filter medium panel has a plurality of outer lateral edge surfaces which together circumferentially surround the multilayer air filter medium panel, the plurality of outer lateral edge surfaces extending from the inflow face to the outflow face;
   at least one pair of correlated locking slits, each locking slit of an individual one of the at least one pair of correlated locking slits formed into a respective one of the plurality of outer lateral edge surfaces and extending laterally from the outer lateral edge surface inwardly into the overlaid filter media, the slits of the at least one pair of correlated locking slits extending through the multilayer air filter medium panel from the inflow face to the outflow face;
      wherein the a first correlated locking slit of the pair of correlated locking slits extend on the inflow face and the outflow face in an inward direction and spaced apart from and not reaching a correlated second locking slit of the pair of correlated locking slits;
      wherein the first correlated locking slit of the pair of correlated locking slits is formed into a different one of the plurality of outer lateral edge surfaces relative to the correlated second locking slit of the pair of correlated locking slits;
      wherein the correlated locking slits are each configured to receive and mountably engage a U-shaped locking member of an exoskeleton support frame for exchangeably mounting the multilayer air filter medium panel onto the exoskeleton support frame.

2. The air filter element according to claim 1, wherein the outer lateral edge surfaces of the multilayer air filter medium panel have:
   a first outer lateral edge surface of the outer lateral edge surfaces of the multilayer air filter medium panel;
   an adjacent second outer lateral edge surface of the outer lateral edge surfaces of the multilayer air filter medium panel;
   wherein the first outer lateral edge surface joins to the adjacent second outer lateral edge surface forming a corner therebetween;
   wherein the first correlated locking slit of the pair of correlated locking slits is arranged in the first outer lateral edge surface;
   wherein the correlated second locking slit of the pair of correlated locking slits is arranged in the adjacent second outer lateral edge surface.

3. The air filter element according to claim 1, wherein the multilayer air filter medium panel is elastically compressible to be fitted under the U-shaped locking member onto exoskeleton support frame to exchangeably mount the multilayer air filter medium panel onto the exoskeleton support frame.

4. The air filter element according to claim 3, further comprising:
   the exoskeleton support frame, comprising:
      a circumferentially closed frame forming an outer boundary of the exoskeleton support frame surrounding an inner flow space opening of the exoskeleton support frame, the circumferentially closed frame sized to have peripheral edges or peripheral edge corners of the circumferentially closed frame arranged against and supporting the multilayer air filter medium panel;
      at least one U-shaped locking member, the U-shaped locking member having two spaced apart legs joined by the mounting member, the two legs having an outer end fastened onto the exoskeleton support frame, the at least one the U-shaped locking member protruding outwardly away from a plane to the exoskeleton support frame; and
      wherein the mounting member of the mounting member is arranged on and extends at least partially across the multilayer air filter medium panel from the first correlated locking slit to the correlated second locking slit of the pair of correlated locking slits.

5. The air filter element according to claim 4, wherein the exoskeleton frame includes:
   one or more support ribs or support rods extending across the circumferentially closed frame and across the inner flow space opening of the exoskeleton support frame, opposing ends of the one or more support ribs or support rods fixedly secured onto the exoskeleton support frame, wherein the one or more support ribs or support rods are spaced apart across inner flow space opening of the exoskeleton support frame;
   wherein the one or more support ribs or support rods extend across the outflow face of the filter medium panel, supporting the filter medium panel against flow forces induced by air flow through the filter medium panel.

6. The air filter element according to claim 5, wherein the exoskeleton frame is formed of metallic wire or rod material forming a structurally rigid exoskeleton support frame.

7. The air filter element according to claim 6, wherein the metallic wire or rod material of the exoskeleton frame is corrosion treated steel, chromed steel or aluminum.

8. The air filter element according to claim 5, wherein the one or more support ribs or support rods intersect in the inner flow space opening of the exoskeleton support frame, forming a support grid.

9. The air filter element according to claim 1, wherein the one or more air filtration ply layers of the filter medium panel include
at least one gas phase treatment medium ply layer having a granular fill configured to trap and remove gas phase contaminates, chemical contaminants and irritating and obnoxious odors, the at least one gas phase treatment medium ply layer having at least one cover sheet;
wherein the granular fill is adhesively bonded to the at least one cover sheet to fix the granular fill in position on the at least one cover sheet and maintain a uniform distribution in the gas phase treatment medium ply layer.

10. The air filter element according to claim 9, wherein the granular fill is selected from the set consisting of: granular activated carbon, a carbon and impregnated alumina blend or a blend of zeolite, carbon and impregnated alumina.

11. The air filter element according to claim 1, wherein the multilayer air filter medium panel further comprises:
at least one a bio-functional carrier layer comprising bio-functional material;
wherein the bio-functional material includes at least one of: anti-viral materials, anti-bacterial materials, and anti-allergenic materials, the bio-functional material arranged on, arranged in, or coated onto or embedded into the at least one bio-functional carrier layer.

12. The air filter element according to claim 1, wherein the synthetic woven fabric material comprises a synthetic polyester material.

13. The air filter element according to claim 1, wherein a radially outer portion of the filter medium panel is resilient and compressible and configured to form a seal between the filter medium panel and a housing configured to receiving the filter medium panel.

14. The air filter element according to claim 1, wherein the filter medium panel has a filtration efficiency rating from MERV 6 to MERV 13.

* * * * *